(12) United States Patent
Kitamura et al.

(10) Patent No.: US 11,448,723 B2
(45) Date of Patent: Sep. 20, 2022

(54) RADAR APPARATUS

(71) Applicant: DENSO CORPORATION, Kariya (JP)

(72) Inventors: Takayuki Kitamura, Kariya (JP);
Takuya Takayama, Kariya (JP);
Kazuhiro Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 230 days.

(21) Appl. No.: 16/936,392

(22) Filed: Jul. 22, 2020

(65) Prior Publication Data

US 2020/0355788 A1    Nov. 12, 2020

Related U.S. Application Data

(63) Continuation of application No. PCT/JP2019/002084, filed on Jan. 23, 2019.

(30) Foreign Application Priority Data

Jan. 24, 2018 (JP) .............................. JP2018-009666

(51) Int. Cl.
*G01S 13/34* (2006.01)
*G01S 7/03* (2006.01)
(Continued)

(52) U.S. Cl.
CPC .............. *G01S 7/032* (2013.01); *G01S 13/34* (2013.01); *G01S 13/931* (2013.01);
(Continued)

(58) Field of Classification Search
CPC ...... G01S 13/325; G01S 13/34; G01S 13/343; G01S 13/42; G01S 13/584; G01S 13/931;
(Continued)

(56) References Cited

U.S. PATENT DOCUMENTS

2011/0074620 A1    3/2011  Wintermantel
2011/0074621 A1    3/2011  Wintermantel
(Continued)

FOREIGN PATENT DOCUMENTS

| CN | 107329108 A | * | 11/2017 | ............... G01S 3/14 |
| JP | 2014-153142 A | | 8/2014 | |
| JP | 2017-58359 A | | 3/2017 | |

*Primary Examiner* — Timothy A Brainard
(74) *Attorney, Agent, or Firm* — Maschoff Brennan

(57) ABSTRACT

A transmission antenna unit includes transmission antennas arranged in a row along a predetermined array direction at a predetermined first interval. A reception antenna unit includes reception antennas arranged in a row along the array direction at a second interval set to differ from the first interval. The transmission antennas and the reception antennas form a virtual array in which virtual reception antennas are arranged in a row along the array direction. The first interval is equal to a multiplication value of a minimum interval being a minimum value of an arrangement interval of the virtual reception antennas and a first multiple being an integer of 2 or greater. The second interval is equal to a multiplication value of the minimum interval and a second multiple being an integer of 2 or greater and set to differ from the first multiple. The first and second multiples are coprime.

8 Claims, 18 Drawing Sheets

(51) Int. Cl.
  *G01S 13/931*  (2020.01)
  *H01Q 1/32*   (2006.01)
  *H01Q 3/30*   (2006.01)
  *H01Q 21/06*  (2006.01)

(52) U.S. Cl.
  CPC ............ *H01Q 1/3233* (2013.01); *H01Q 3/30* (2013.01); *H01Q 21/061* (2013.01); *G01S 13/343* (2013.01)

(58) Field of Classification Search
  CPC .... G01S 7/032; H01Q 1/3233; H01Q 21/061; H01Q 3/30
  See application file for complete search history.

(56) References Cited

U.S. PATENT DOCUMENTS

| | | |
|---|---|---|
| 2011/0080313 A1 | 4/2011 | Wintermantel et al. |
| 2011/0080314 A1 | 4/2011 | Wintermantel |
| 2012/0128100 A1 | 5/2012 | Hasegawa |
| 2016/0154091 A1 | 6/2016 | Yosoku et al. |
| 2016/0285172 A1 | 9/2016 | Kishigami et al. |
| 2017/0082730 A1 | 3/2017 | Kishigami et al. |
| 2017/0149147 A1 | 5/2017 | Minami et al. |
| 2017/0276769 A1* | 9/2017 | Kishigami ............ G01S 7/0234 |
| 2018/0088224 A1* | 3/2018 | Kishigami ............ H01Q 21/06 |
| 2018/0149736 A1* | 5/2018 | Alland ................. H01Q 21/28 |
| 2019/0067835 A1 | 2/2019 | Kishigami et al. |
| 2019/0195984 A1* | 6/2019 | Goda ................... H01Q 21/065 |
| 2020/0044361 A1 | 2/2020 | Kishigami et al. |

* cited by examiner

FIG.4
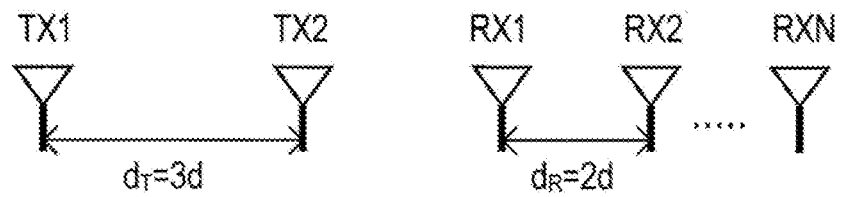
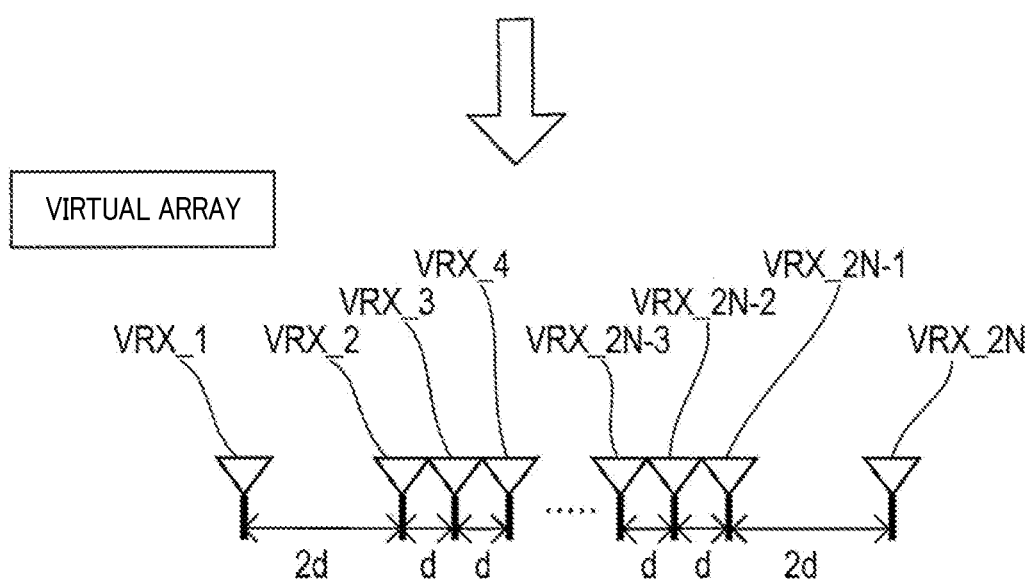
FIG.5
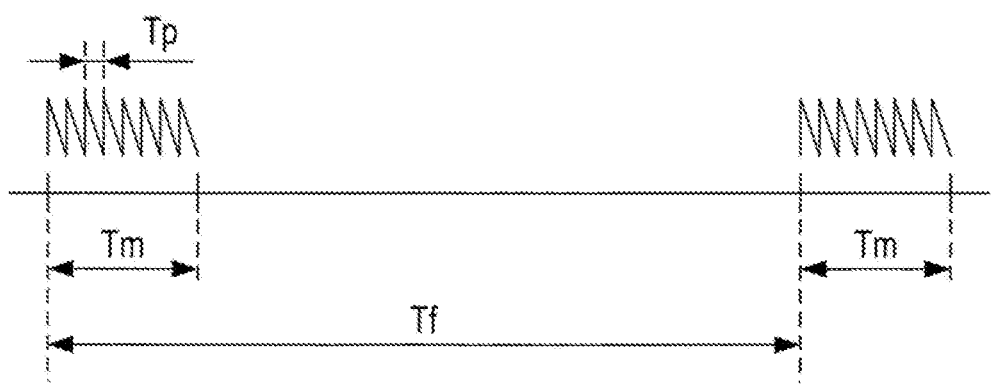

WHEN NUMBER OF PHASES P = 4

FIG.14
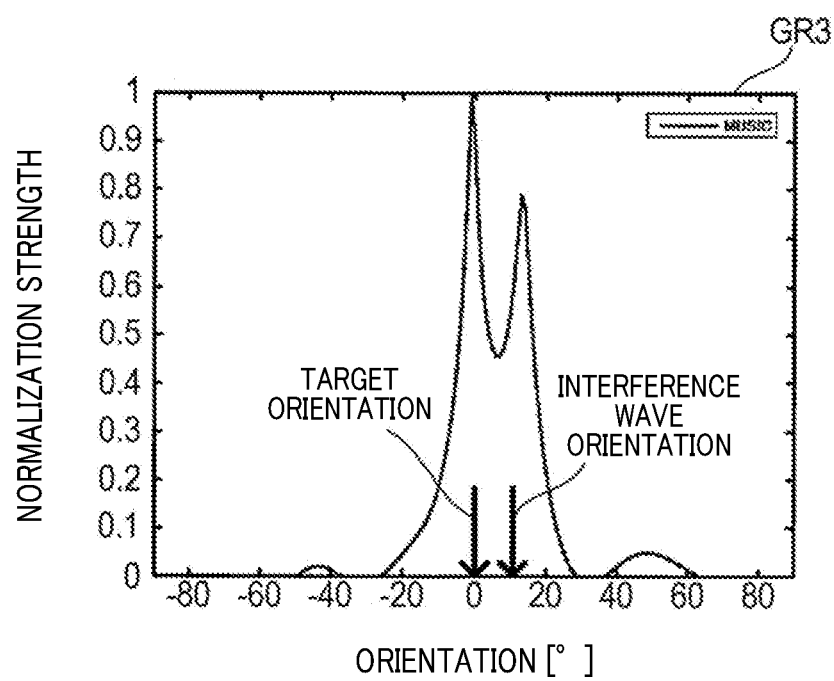
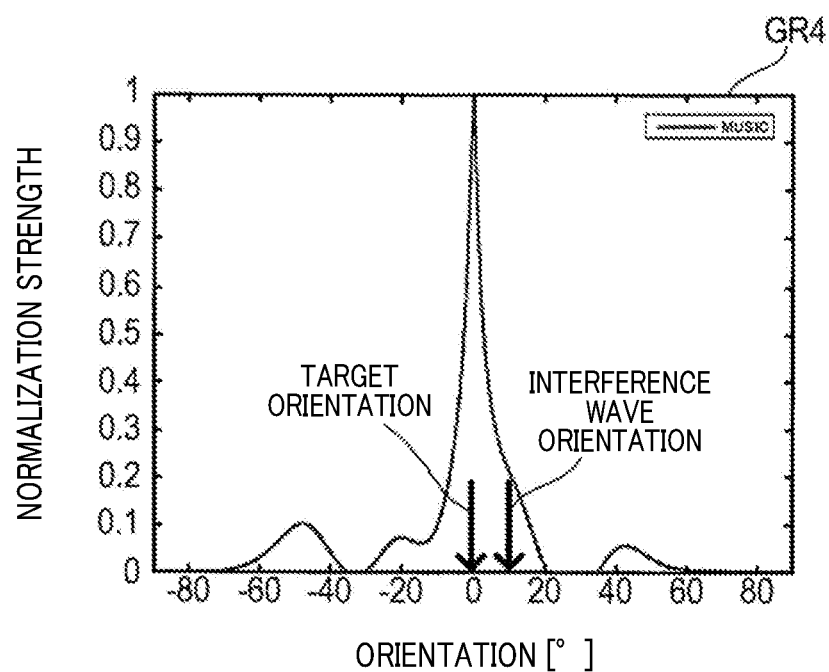

FIG.15
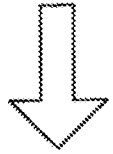
VIRTUAL ARRAY
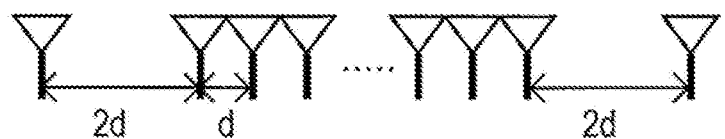

RADAR APPARATUS

CROSS-REFERENCE TO RELATED APPLICATIONS

The present application is a continuation application of International Application No. PCT/JP2019/002084, filed Jan. 23, 2019, which claims priority to Japanese Patent Application No. 2018-009666, filed Jan. 24, 2018. The contents of these applications are incorporated herein by reference in their entirety.

BACKGROUND

Technical Field

The present disclosure relates to a radar apparatus that detects an object by transmitting and receiving radio waves through a plurality of antennas.

Related Art

A known radar apparatus includes a transmission antenna unit and a reception antenna unit. The transmission antenna unit includes a plurality of transmission antennas that are arranged in a row along a predetermined array direction. The reception antenna unit includes a plurality of reception antennas that are arranged in a row along the array direction.

SUMMARY

An aspect of the present disclosure provides a radar apparatus that includes a transmission antenna unit, a reception antenna unit, and a processor. The transmission antenna unit includes a plurality of transmission antennas that are arranged in a row along a predetermined array direction at a predetermined first interval. A reception antenna unit includes a plurality of reception antennas that are arranged in a row along the array direction at a second interval set to differ from the first interval. The plurality of transmission antennas and the plurality of reception antennas form a virtual array in which a plurality of virtual reception antennas are arranged in a row along the array direction. The first interval is equal to a multiplication value of a minimum interval being a minimum value of an arrangement interval of the virtual reception antennas and a first multiple being an integer of 2 or greater. The second interval is equal to a multiplication value of the minimum interval and a second multiple being an integer of 2 or greater and set to differ from the first multiple. The first multiple and the second multiple are coprime.

BRIEF DESCRIPTION OF THE DRAWINGS

In the accompanying drawings:

FIG. 4 is a diagram of an arrangement of transmission antennas and reception antennas, and an arrangement of reception antennas in a virtual array;

FIG. 5 is a diagram of a function of an oscillator:

FIG. 14 is a diagram of an orientation spectrum when a target orientation is estimated using a MUSIC method;

FIG. 15 is a diagram of an arrangement of reception antennas in a virtual array when $d_T=2d$ and $d_R=3d$;

DESCRIPTION OF THE EMBODIMENTS

Figure 1:
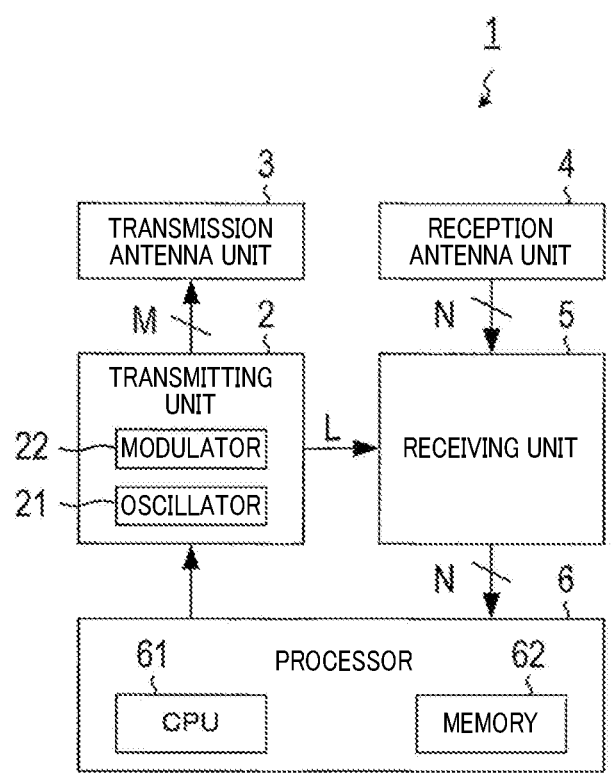
FIG. 1 is a block diagram of a configuration of a radar apparatus.

JP-A-2011-526370 describes a radar apparatus that includes a transmission antenna unit and a reception antenna unit. The transmission antenna unit includes a plurality of transmission antennas that are arranged in a row along an array direction that is set in advance. The reception antenna unit includes a plurality of reception antennas that are arranged in a row along the array direction.

In the radar apparatus described in JP-A-2011-526370, an arrangement interval between two transmission antennas is 4d. An arrangement interval between four reception antennas is d. Therefore, in the radar apparatus described in JP-A-2011-526370, a virtual array in which eight virtual reception antennas are arranged in a row along the array direction at the arrangement interval d is formed.

However, as a result of a detailed review by the inventors, an issue has been found in that, in the radar apparatus described in JP-A-2011-526370, the arrangement interval of the reception antennas coincides with the arrangement interval of the virtual reception antennas. Because the arrangement interval of the reception antennas is narrow, isolation of a reception channel is poor, and detection accuracy of regarding an orientation of an object decreases.

It is thus desired to improve detection accuracy regarding an orientation of an object.

An exemplary embodiment provides a radar apparatus that includes a transmission antenna unit, an oscillator, a modulator, a reception antenna unit, and a processor.

The transmission antenna unit includes a plurality of transmission antennas that are arranged in a row along an array direction that is set in advance, at a first interval that is set in advance. The oscillator is configured to generate a common signal that is a continuous wave. The modulator is configured to generate a plurality of transmission signals that are inputted to the plurality of transmission antennas, by performing phase-shift keying in which a phase of a split signal is rotated at each repetition period set in advance, by a phase rotation amount that differs for each of a plurality of split signals generated by splitting the common signal into a same number of signals as the plurality of transmission antennas. The reception antenna unit includes a plurality of reception antennas that are arranged in a row along the array direction at a second interval that is set to differ from the first interval. The processor is configured to generate information related to an object that reflects a radiation wave from the transmission antenna unit based on a plurality of signal components corresponding to the plurality of transmission signals extracted from each of a plurality of reception signals received by the reception antenna unit.

In the radar apparatus, the plurality of transmission antennas and the plurality of reception antennas form a virtual array in which a plurality of virtual reception antennas are arranged in a row along the array direction. The first interval is equal to a multiplication value of a minimum interval that is a minimum value of an arrangement interval of the plurality of virtual reception antennas and a first multiple that is an integer of 2 or greater. The second interval is equal to a multiplication value of the minimum interval and a second multiple that is an integer of 2 or greater and set to differ from the first multiple. The first multiple and the second multiple are coprime.

The radar apparatus configured in this manner is capable of improving isolation between reception channels and improving detection accuracy regarding an orientation of an object, because an arrangement interval between the plurality of reception antennas is equal to or greater than twice an arrangement interval between the virtual reception antennas and a physical reception-channel interval can be widened.

An embodiment of the present disclosure will hereinafter be described with reference to the drawings.

A radar apparatus 1 according to the present embodiment is mounted in a vehicle and detects various objects that are present in the periphery of the vehicle. The radar apparatus 1 is a MIMO radar that simultaneously transmits and receives radio waves through a plurality of antennas. MIMO is an abbreviation of multiple-input multiple-output.

As shown in FIG. 1, the radar apparatus 1 includes a transmitting unit 2, a transmission antenna unit 3, a reception antenna unit 4, a receiving unit 5, and a processor 6.

The transmission antenna unit 3 includes M transmission antennas. M is an integer of 2 or greater. The transmission antennas are arranged in a row along an array direction that is set in advance, at a first interval $d_T$ that is set in advance. According to the present embodiment, the array direction is a width direction of the vehicle.

The reception antenna unit 4 includes N reception antennas. N is an integer of 2 or greater. The reception antennas are arranged in a row along a direction that is the same as the array direction of the transmission antenna, at a second interval $d_R$ that differs from the first interval $d_T$.

Figure 2:
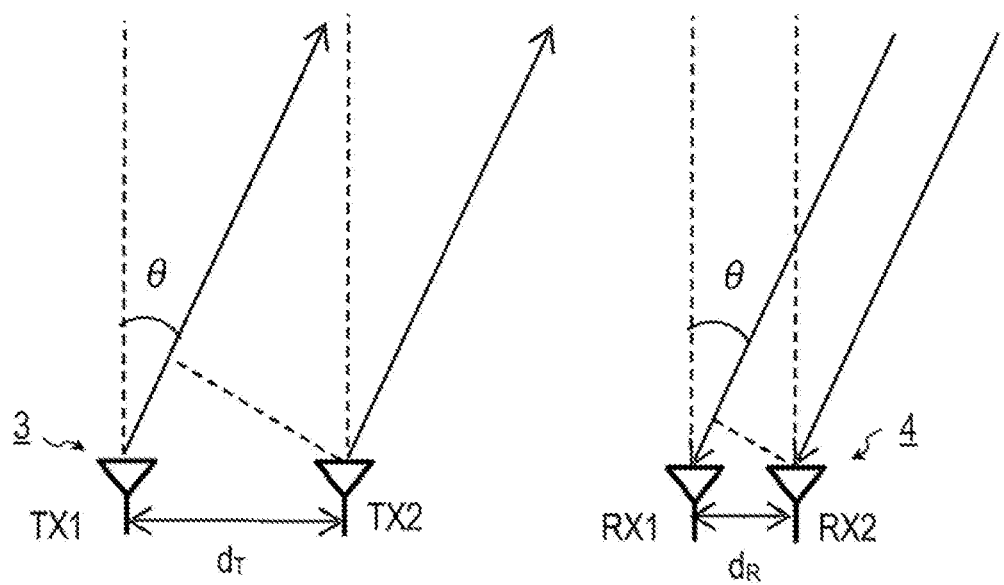
FIG. 2 is a diagram of relationships between transmission antennas and reception antennas, and an object.

Here, signals that are received by the reception antennas when M=2 and N=2 will be described. As shown in FIG. 2, an object that serves as a detection target is presumed to be present in a direction that is tilted by an angle θ in relation to a front direction of the transmission antenna unit 3 and the reception antenna unit 4. In addition, a reflection coefficient at the object is denoted by D. A phase change of a signal on a path from a transmission antenna TX1 to the object is denoted by $\alpha_T$. A phase change of a signal on a path from the object to a reception antenna RX1 is denoted by $\alpha_R$. Here, $\alpha_T$ and $\alpha_R$ are expressed by complex numbers.

In this case, a signal that is transmitted from the transmission antenna TX1 and received by the reception antenna RX1 is expressed by expression (1). A signal that is transmitted from the transmission antenna TX1 and received by a reception antenna RX2 is expressed by expression (2). A signal that is transmitted from a transmission antenna TX2 and received by the reception antenna RX1 is expressed by expression (3). A signal that is transmitted from the transmission antenna TX2 and received by the reception antenna RX2 is expressed by expression (4).

$$\alpha_T \cdot D \cdot \alpha_R \tag{1}$$

$$\alpha_T \cdot D \cdot \alpha_R \cdot \exp(jkd_R \sin\theta) \tag{2}$$

$$\alpha_T \cdot D \cdot \alpha_R \cdot \exp(jkd_T \sin\theta) \tag{3}$$

$$\alpha_T \cdot D \cdot \alpha_R \cdot \exp(jk(d_T+d_R)\sin\theta) \tag{4}$$

Figure 3:
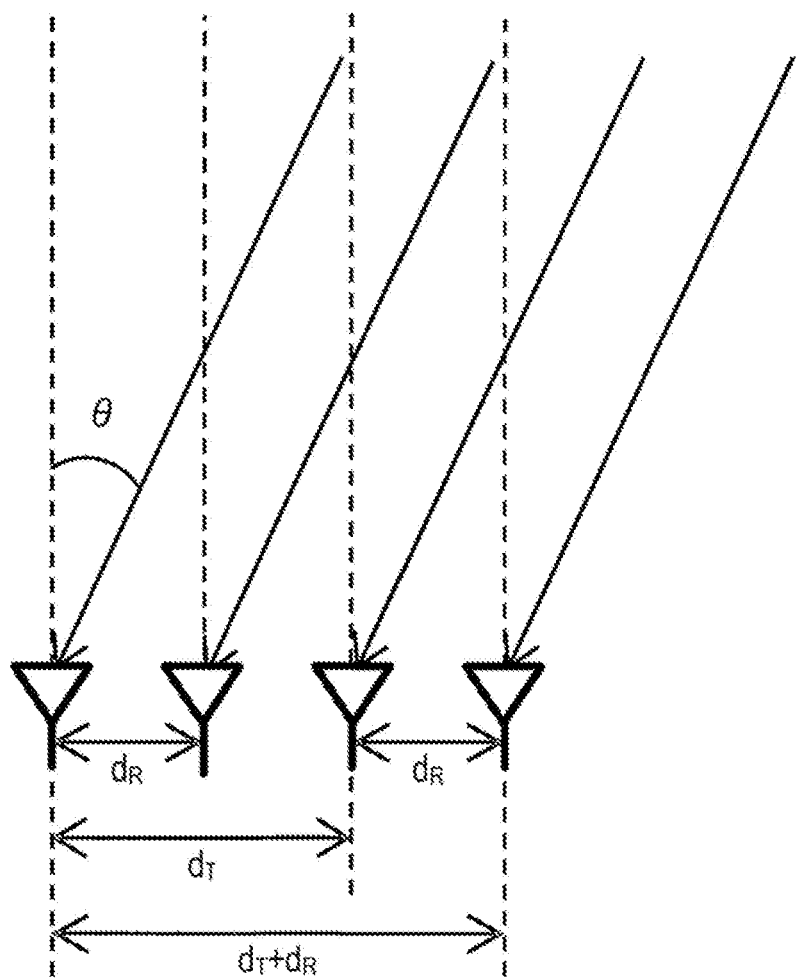
FIG. 3 is a diagram of an arrangement of reception antennas in a virtual array.

These expressions are equivalent to a case in which four reception antennas are arranged in positions in which distances from a reception antenna that serves as reference are respectively $d_R$, $d_T$, and $d_T+d_R$, as shown in FIG. 3. In FIG. 3, the reception antenna that is positioned furthest to the left serves as a reference. Virtual reception antennas (referred to, hereafter, as virtual reception antennas) that are arranged in this manner are referred to as a virtual array.

In the MIMO radar, through use of the virtual array, an angular resolution that is equal to that when a single transmission antenna and M×N reception antennas are provided is obtained using M+N transmission antennas and reception antennas.

According to the present embodiment, as shown in FIG. 4, $d_T$=3d, and $d_R$=2d. d is a minimum interval of the virtual array. Here, in FIG. 4, M=2 for simplification of the drawing. That is, FIG. 4 shows a virtual array when two transmission antennas TX1 and TX2, and N reception antennas RX1, RX2, . . . , RXN are arranged along the array direction.

As a result, a virtual array in which 2N virtual reception antennas VRX_1, VRX_2, VRX_3, VRX_4, . . . , VRX_2N−3, VRX_2N−2, VRX_2N−1, and VRX_2N are arranged along the array direction is formed. A distance between the virtual reception antenna VRX_1 and the virtual reception antenna VRX_2, and a distance between the virtual reception antenna VRX_2N−1 and the virtual reception antenna VRX_2N are 2d. The distances between other adjacent virtual reception antennas are d.

As shown in FIG. 1, the transmitting unit 2 includes an oscillator 21 and a modulator 22. The oscillator 21 generates a common signal that is a continuous wave. The oscillator 21 supplies the generated common signal to the modulator 22 and also supplies the generated common signal to the receiving unit 5 as a local signal L. In addition, as shown in FIG. 5, the oscillator 21 repeatedly generates, at a repetition period Tp (such as 50 μs), a chirp signal of which a frequency continuously changes, during a measurement period Tm (such as 10 ms) at a head of each frame, a single frame being a measurement period Tf (such as 50 ms).

The oscillator 21 is configured to be capable of changing the measurement period Tf, the measurement period Tm, and the repetition period Tp as appropriate, based on a command from the processor 6. Here, a frequency width of the chirp signal that is changed during the repetition period is fixed regardless of the repetition period Tp. That is, the configuration is such that a change rate Δf of the frequency of the chirp signal changes as a result of the repetition period Tp being changed.

In addition, an allowable range of the repetition period Tp and an allowable range of the change rate Δf of the frequency of the chirp signal are set such that a frequency deviation that occurs based on relative speed to an object is reduced to a negligible degree compared to a frequency deviation that occurs based on a distance to the object, when a beat signal that is generated by the transmission signal and the reception signal being mixed is analyzed.

The modulator 22 splits the common signal that is generated by the oscillator 21 and generates M split signals, the amount of which is the same as the number of transmission antennas belonging to the transmission antenna unit 3. The modulator 22 performs phase-shift keying in which, for each of the M split signals, the phase of the split signal is changed at each repetition period Tp. As a result, M transmission signals that are respectively supplied to the transmission antennas are generated. In the phase-shift keying, phase rotation amounts Δ100 of differing magnitudes are respectively set for the M split signals. The phase of split signal is rotated by the phase rotation amount Δφ at each repetition period.

Figure 6:
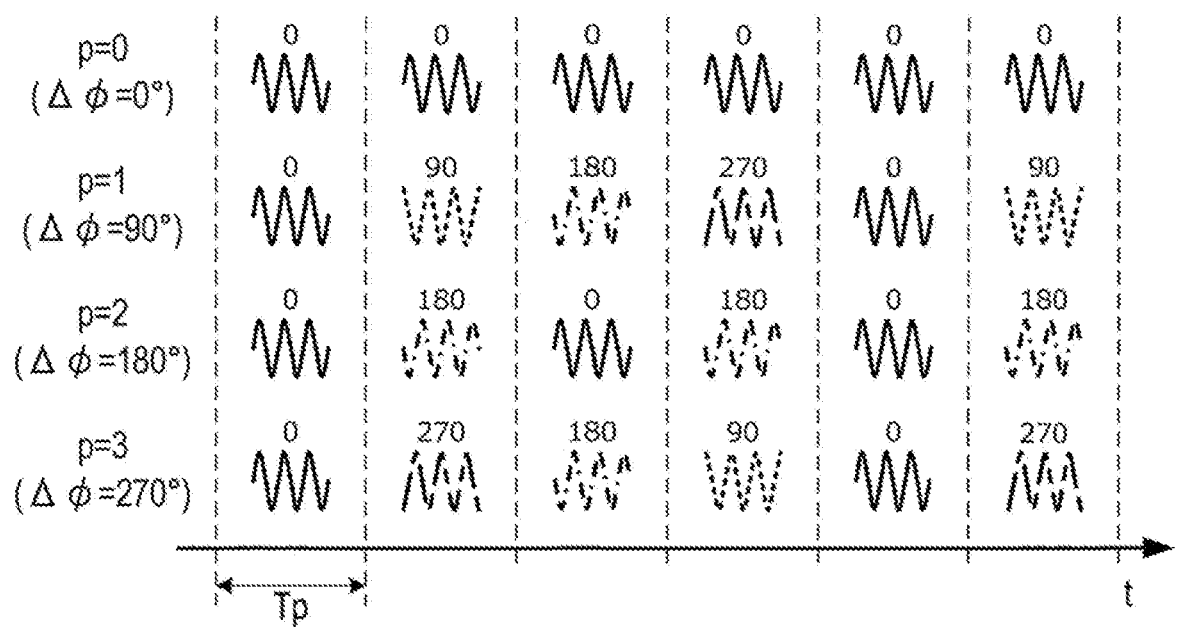
FIG. 6 is a diagram of an example of phase rotation amounts used for phase-shift keying in a modulator.

Here, a number of phases that are used in the phase-shift keying is P. P is an integer that is greater than M. In the modulator 22, P types of phase rotation amounts expressed by Δφ=p×360°/P, where p=0, 1, 2, . . . P−1, are used. For example, when P=4, as shown in FIG. 6, Δφ=0° when p=0. A phase difference of a transmission signal that is a signal after modulation in relation to a split signal (that is, the common signal) that is a signal before modulation is 0° at all repetition periods Tp. When p=1, Δφ=90°. The phase difference of the transmission signal in relation to the common signal is switched at each repetition period Tp, changing in order of 0°→90°→180°→270°→0° (the same applies hereafter). When p=2, Δφ=180°. The phase difference of the transmission signal in relation to the common signal is switched at each repetition period, changing in order of 0°→180°→0°→180°→0° (the same applies hereafter). When p=3, Δφ=270°. The phase difference of the transmission signal in relation to the common signal is switched at each repetition period, changing in order of 0°→270°→180°→90°→0° (the same applies hereafter).

Because the setting is such that P>M as described above, in the phase-shift keying, not all types of the P types of phase rotation amounts Δφ are used. A portion thereof is used.

The modulator 22 is configured to be capable of changing, as appropriate, the setting of the number of phases P, selection of M types of phase rotation amounts used for the phase-shift keying among the P types of phase rotation amounts, and a setting regarding a corresponding relationship between the selected M types of phase rotation amounts and the M transmission antennas. The changes to the settings may be made based on a command from the processor 6. Alternatively, the changes to the settings may be automatically made. When the settings are automatically changed, the changes may be made based on a pattern that is determined in advance or at random.

As shown in FIG. 1, the receiving unit 5 generates the beat signal that is a difference signal with the local signal L, for each of the N reception signals outputted from the reception antennas belonging to the reception antenna unit 4, samples the generated beat signals and supplies the sampled beat signals to the processor 6. Hereafter, a configuration for generating the beat signal from the reception signal in correspondence to each reception antenna (such as a mixer, an amplifier, and an analog-to-digital [AD] converter that are provided in correspondence to each reception antenna) is collectively referred to as a reception channel.

The processor 6 is an electronic control apparatus that is mainly configured by a known microcomputer that includes a central processor (CPU) 61, a memory 62, and the like. For example, the memory 62 is a read-only memory (ROM) or a random access memory (RAM). Various functions of the microcomputer are actualized by the CPU 61 running a program that is stored in a non-transitory computer-readable storage medium. In this example, the memory 62 corresponds to the non-transitory computer-readable storage medium in which the program is stored. In addition, a method corresponding to the program is performed as a result of the program being run. Here, some or all of the functions provided by the CPU 61 may be configured by hardware, such as by one or a plurality of integrated circuits (ICs). In addition, the processor 6 may be configured by one or a plurality of microcomputers.

Next, steps in an object detection process that is performed by the processor 6 will be described. The object detection process is a process that is repeatedly performed after the processor 6 is started.

Figure 7:
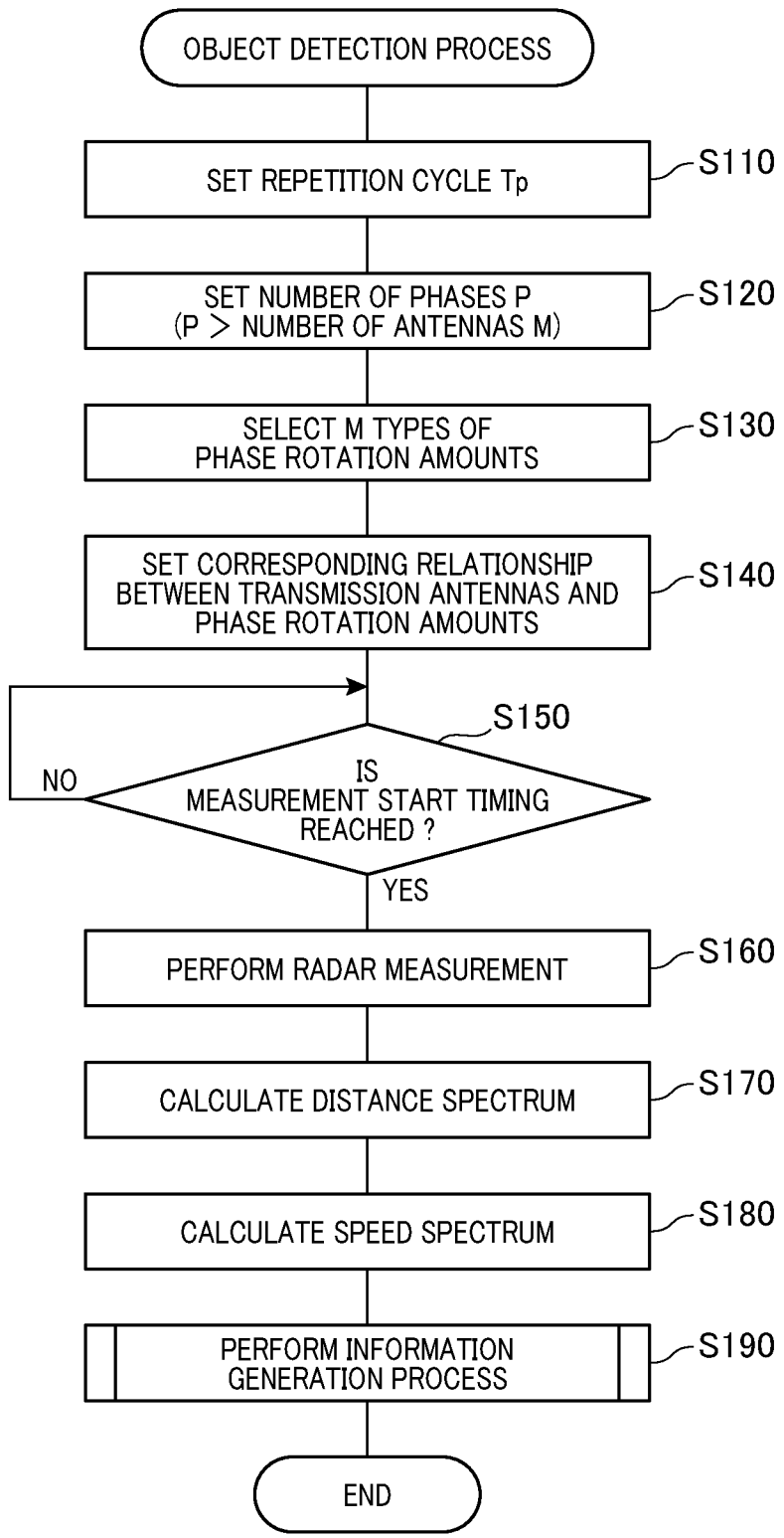
FIG. 7 is a flowchart of an object detection process.

When this object detection process is performed, as shown in FIG. 7, first, at S110, the processor 6 sets the repetition period Tp that is a parameter related to the common signal that is generated in the oscillator 21. As described above, when the repetition period is changed, the change rate Δf of the frequency of the chirp signal changes. Here, the repetition period Tp may be a fixed value. Alternatively, the repetition period Tp may be set based on a pattern that is determined in advance each time the present process is performed, or by random selection from a plurality of types of values. In addition, at S110, the measurement period Tf and the measurement period Tm may be variably set as appropriate.

At S120, the processor 6 sets the number of phases P that is used for the phase-shift keying in the modulator 22. As the number of phases P, a value that is greater than the number of transmission antennas M is used. For example, P=M+1 may be set. In a manner similar to the repetition period Tp, the number of phases P may be a fixed value. Alternatively, the number of phases P may be set based on a pattern that is determined in advance each time the present process is performed, or by random selection from a plurality of types of values.

At S130, the processor 6 selects the M types of phase rotation amounts used for the phase-shift keying in the modulator 22, among the P types of phase rotation amounts determined by the number of phases P. The M types of phase rotation amounts are selected such that the rotation amounts are not evenly arranged over 360°, that is, such that the rotation amounts are unevenly arranged.

Specifically, when P and M do not have a common divisor, the phase rotation amounts can be arbitrarily selected. When P and M have a common divisor, the selection is required to be made with care such that arrangement intervals are not repeats of a same pattern.

Figure 8:
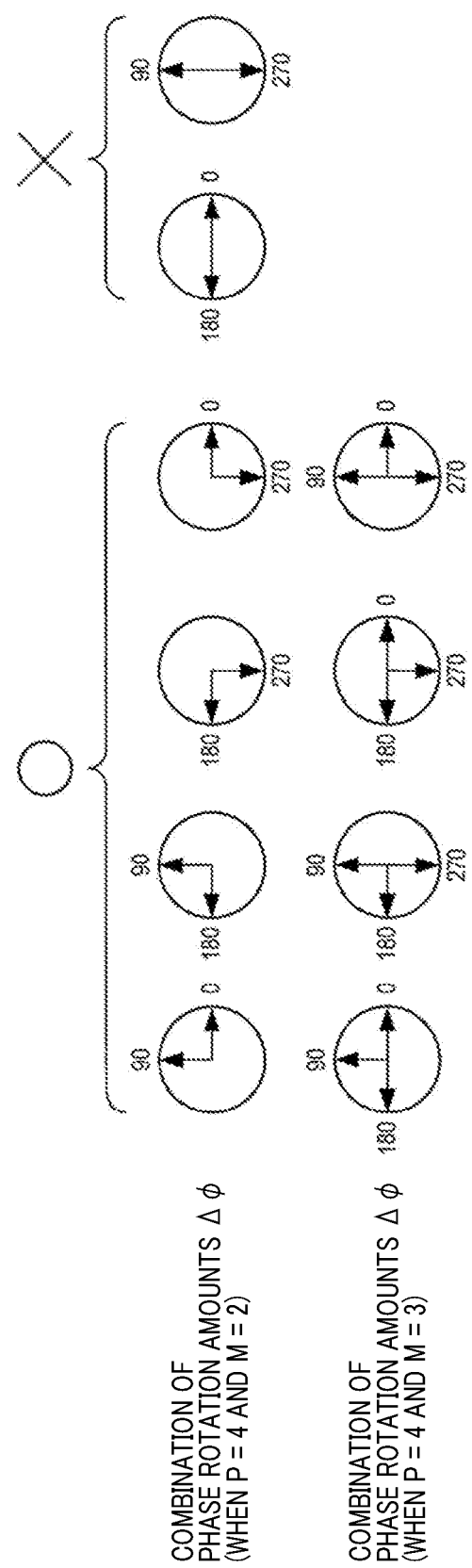
FIG. 8 is a diagram of selectable and unselectable combination patterns of phase rotation amounts.

For example, as shown in FIG. 8, when P=4 and M=2, (0°, 90°), (90°, 180°), (180°, 270°), and (270°, 0°) can be selected as combinations of phase rotation amounts. However, (0°, 180°) and (90°, 270°) cannot be selected. In addition, when P=4 and M=3, (0°, 90°, 180°), (90°, 180°, 270°), (180°, 270°, 0°), and (270°, 0°,90°) can all be selected as combinations of phase rotation amounts. However, according to the present embodiment, a combination that includes Δφ=0° is selected at all times.

Here, the selection of the phase rotation amounts may be fixed at all times. Alternatively, the selection of the phase rotation amounts may be switched based on a pattern that is determined in advance or at random, among the selectable combinations, each time the present process is performed.

At S140, the processor 6 sets a corresponding relationship between the M types of phase rotation amounts selected at S130 and the transmission antennas. For example, this correspondence may be assigned based on a rule that is set in advance or assigned at random. In addition, the correspondence may be fixed at all times. Alternatively, the correspondence may be switched based on a pattern that is determined in advance or at random, each time the present process is performed.

Figure 9:
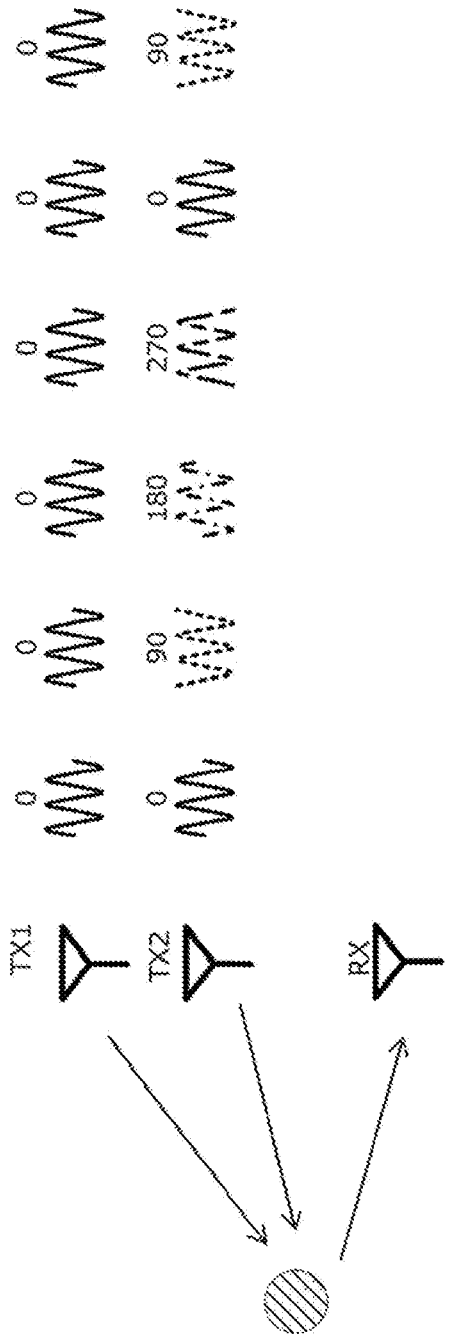
FIG. 9 is a diagram of an example of selection of phase rotation amounts.

FIG. 9 expresses an aspect in which the phases of the transmission signals that are respectively supplied to the transmission antennas TX1 and TX2 change, when P=4 and M=2, (0°, 90°) is selected as the combination of phase rotation amounts, and Δφ=0° is assigned to the transmission antenna TX1 and Δφ=90° is assigned to the transmission antenna TX2.

At S150, the processor 6 determines whether a measurement start timing is reached. When determined that the measurement start timing is not reached, the processor 6 waits by repeating the process at S150 until the measurement start timing is reached. When determined that the measurement start timing is reached, the processor 6 proceeds to S160. The measurement start timing is a timing at which a frame of which a length is determined by the measurement period Tf is switched.

Upon proceeding to S160, the processor 6 operates the transmitting unit 2 based on the setting results at S110 to S140 and performs radar measurement. Specifically, the processor 6 makes the transmitting unit 2 repeatedly transmit the chirp signal at each repetition period Tp during the measurement period Tm, and acquires a sampling result of the beat signals that are generated from the reception signals thereof. Hereafter, a number of chirp signals that are repeatedly transmitted during the measurement period Tm is K.

At S170, the processor 6 calculates K distance spectrums for each of the N reception antennas by performing frequency analysis on the sampling results of the beat signals acquired from the N reception antennas, for each reception antenna and for each chirp signal. In the distance spectrum, a peak appears at a frequency based on an amount of time required to move to and from an object that reflects a radiation wave transmitted from the transmission antenna (that is, a distance to the object).

At S180, the processor 6 calculates a velocity spectrum for each reception antenna using N×K distance spectrums calculated at S170. Specifically, the processor 6 extracts signals of a same frequency bin from the K distance spectrums related to a reception antenna of interest, and performs a frequency analysis process on the extracted signals in a time-axis direction. This process is performed on all frequencies bin (that is, distances).

In the velocity spectrum, when a relative speed to the object that reflects the radiation wave from the transmission antenna unit 3 is zero, a frequency that is based on the phase rotation amount allocated to each transmission antenna is extracted as a Doppler frequency. That is, a frequency of a signal component corresponding to Δφ=0° is 0 Hz.

Figure 10:
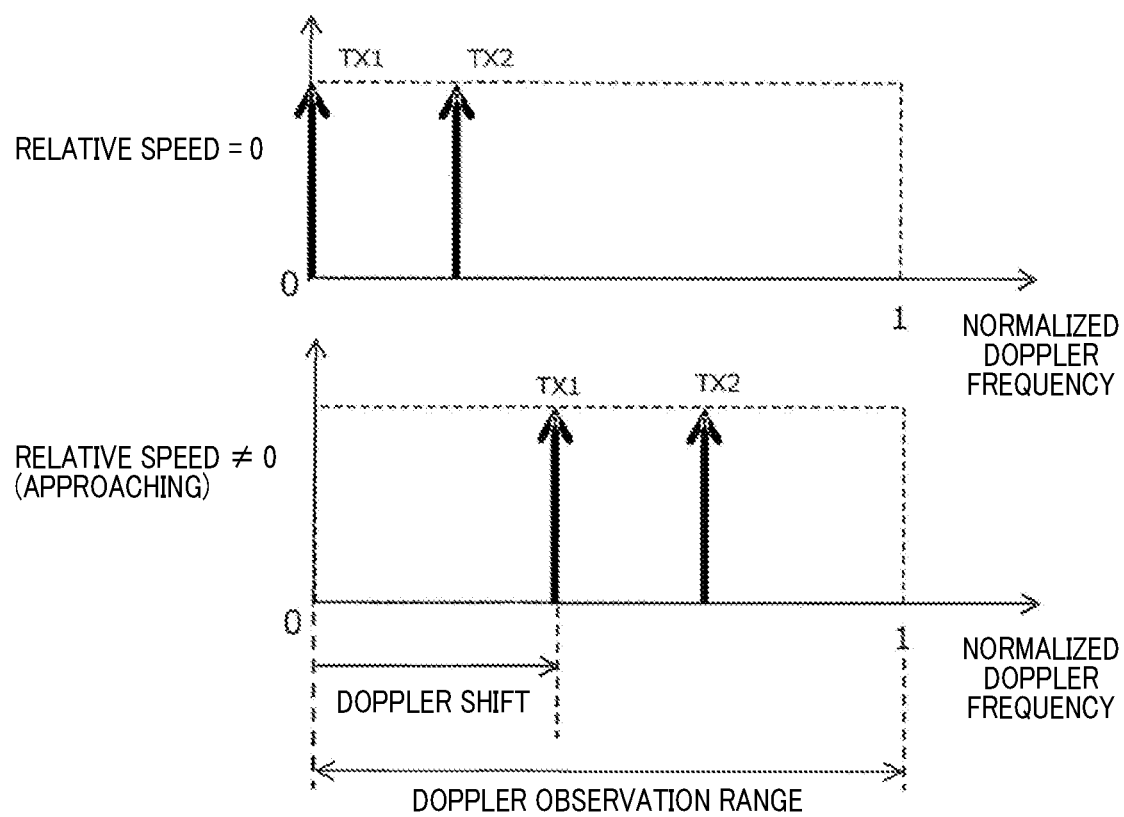
FIG. 10 is a diagram of an example of a same-object peak group that appears on a velocity spectrum.

Here, a range over which the Doppler frequency is observed (hereafter, a Doppler observation range) is determined by the repetition period Tp. In addition, as shown in FIG. 10, the Doppler frequency is detected at M points among points dividing the Doppler observation range into P. In FIG. 10, an upper limit of the Doppler observation range is normalized at 1.

In addition, in the velocity spectrum, when a relative speed to the object is present, the M Doppler frequencies shift by a magnitude based on the relative speed, and folding of the frequency occurs based on a magnitude of the relative speed.

Based on the calculation results at S170 and S180, a two-dimensional spectrum (hereafter, a reception spectrum) that expresses a distance and a relative speed to an object that reflects a radar wave is generated for each reception antenna.

As shown in FIG. 7, at S190, the processor 6 performs an information generation process in which the distance and the relative speed to the object that reflects the radar wave, and an orientation at which the object is present are calculated using the reception spectrum for each reception antenna. The processor 6 ends the object detection process.

Next, steps in the information generation process performed at S190 will be described.

Figure 11:
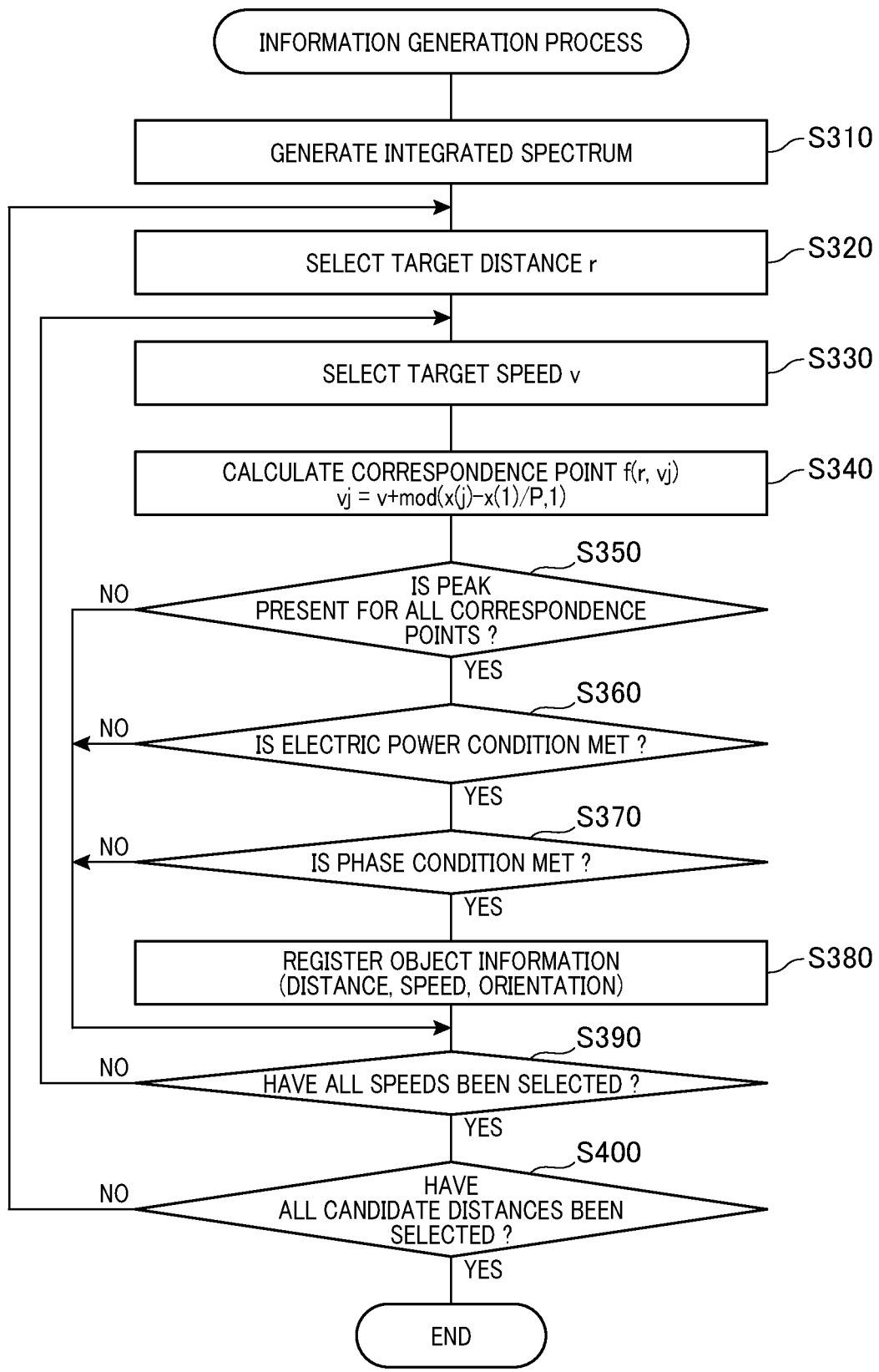
FIG. 11 is a flowchart of an information generation process.

When the information generation process is performed, as shown in FIG. 11, first, at S310, the processor 6 performs incoherent integration of the N reception spectrums generated for the reception antennas at S180 and calculates a single integrated spectrum g(r, v). With the reception spectrum for each reception antenna expressed by s(r, v, Rch), the integrated spectrum g(r, v) is calculated using expression (5). r denotes distance, v denotes a normalized Doppler speed of which a speed corresponding to an upper limit frequency of the Doppler observation range is 1, and Rch is a number that identifies the reception antenna.

$$g(r, v) = \sum_{Rch=1}^{N} |s(r, v, Rch)|^2 \quad (5)$$

At S320, the processor 6 selects, as a target distance r, a distance that is not yet selected as a subject for processing at S330 to S380, below, among candidate distances. The candidate distances are distances at which M peaks or more that have a strength that is equal to or greater than a threshold set in advance are detected on the integrated spectrum.

At S330, the processor 6 selects, as a target speed v, a speed that corresponds to a peak that is not yet selected as a processing subject at S340 to S370, below, among a plurality of peaks that are detected at the target distance r selected at S320. Here, the speed is selected in order from lowest.

At S340, the processor 6 calculates M-1 correspondence points (r, vj), where j=2 to M, at which a peak that corresponds to another phase rotation amount is estimated to be present, based on expression (6), under an assumption that the peak of the target speed v is a peak that corresponds to the phase rotation amount Δφ=0°. x(j) is a phase rotation amount other than Δφ=0° selected at S130. v and vj are normalized Doppler frequencies and are values from 0 to 1. mod(a, m) denotes a remainder after a is divided by m.

$$v_j = v + \mathrm{mod}(x(j) - x(1)/P, 1) \quad (6)$$

At S350, the processor 6 determines whether a peak (that is, a secondary maximum point) is present on the integrated spectrum, regarding all correspondence points estimated at S340. When determined YES, the processor 6 proceeds to S360. When determined NO, the processor 6 proceeds to S390. Hereafter, the M peaks corresponding to the correspondence points are referred to as a candidate peak group.

Upon proceeding to S360, the processor 6 determines whether the candidate peak group meets an electric power condition. When determined YES, the processor 6 proceeds to S370. When determined NO, the processor 6 proceeds to S390. Here, as the electric power condition, a signal strength difference between peaks belonging to the candidate peak group being within an allowable range set in advance is used. This is based on knowledge that signal strengths of peaks that are based on reflected waves from a same object should all be similar.

Upon proceeding to S370, the processor 6 determines whether the candidate peak group meets a phase condition. When determined YES, the processor 6 proceeds to S380. When determined NO, the processor 6 proceeds to S390. Here, as the phase condition, a reception-channel phase difference between a reference reception channel and a reception channel other than the reference reception channel being calculated and a difference in this phase difference between candidate peaks being within an allowable range set in advance is used. This is based on an inter-reception phase difference between peaks arriving from a same direction all being similar in magnitude, based on knowledge that peaks that are based on reflected waves from the same object should all arrive from a same direction. Hereafter, the candidate peak group that is determined YES at S370 is referred to as a same-object peak group.

Upon proceeding to S380, the processor 6 registers a set of target distance r and target speed v as object information. Furthermore, the processor 6 also adds an orientation θ that is calculated in the manner below to the object information. That is, from each of the N reception spectrums calculated for the reception antennas, the M of peaks corresponding to the same-object peak group are extracted. The extracted M×N peaks are considered to be reception signals from the M×N reception antennas included in the virtual array. As a result of an orientation detection process, such as MUSIC or beam forming, being performed, the orientation θ of the object is calculated. MUSIC is an abbreviation for Multiple Signal Classification.

Here, the M peaks that are extracted as the same-object peak group from each reception signal of the N reception antennas correspond to the M×N reception signals acquired from the virtual array.

Upon proceeding to S390, the processor 6 determines whether all of the peaks (that is, speeds) detected at the target distance r have been selected as the target speed v. When determined YES, the processor 6 proceeds to S400. When determined NO, the processor 6 proceeds to S330.

Upon proceeding to S400, the processor 6 determines whether all of the candidate distances have been selected as the target distance r. When determined YES, the processor 6 ends the information generation process. When determined NO, the processor 6 proceeds to S320.

The radar apparatus 1 that is configured in this manner includes the transmission antenna unit 3, the oscillator 21, the modulator 22, the reception antenna unit 4, and the processor 6.

The transmission antenna unit 3 includes M transmission antennas that are arranged in a row along an array direction that is set in advance, at a first interval $d_T$ that is set in advance. The oscillator 21 generates a common signal that is a continuous wave. The modulator 22 generates M transmission signals that are inputted to a plurality of transmission antennas by performing phase-shift keying in which a phase of a split signal is rotated at each repetition period Tp set in advance, at a phase rotation amount that differs for each of M split signals generated by splitting the common signal into a same number of signals as the M transmission antennas. The reception antenna unit 4 includes N reception antennas that are arranged in a row along the array direction at a second interval $d_R$ that is set to differ from the first interval $d_T$. The processor 6 generates object information related to an object that reflects a radiation wave from the transmission antenna unit 3, based on a plurality of signal components corresponding to M transmission signals extracted from each of N reception signals received by the reception antenna unit 4.

In addition, in the radar apparatus 1, a virtual array in which a plurality of virtual reception antennas are arranged in a row along the array direction is formed by the M transmission antennas and the N reception antennas,. In addition, the first interval $d_T$ is equal to a multiplication value of a minimum interval d that is a minimum value of the arrangement interval of the plurality of virtual reception antennas and a first multiple that is an integer of 2 or greater. The second interval is equal to a multiplication value of the minimum interval d and a second multiple that is an integer of 2 or greater and set to differ from the first multiple. Furthermore, according to the present embodiment, the first multiple is 3, the second multiple is 2, and the first multiple and the second multiple are coprime.

In this manner, the radar apparatus 1 is capable of improving isolation between reception channels and improving detection accuracy regarding the orientation of an object, because the arrangement interval of the N reception antennas is equal to or greater than twice the arrangement interval of the virtual reception antennas, and a physical reception-channel interval can be widened.

In addition, the radar apparatus 1 according to the present embodiment can improve orientation estimation accuracy regarding a target in a state in which a target signal and a mirror ghost signal are superposed.

When the orientation is estimated using MIMO, orientation scanning is performed in a state in which a transmission steering vector that indicates an orientation of a transmission signal and a reception steering vector that indicates an orientation of a reception signal are aligned in a same direction.

In a signal that is directly received by the reception antenna after being reflected by a true target (hereafter, a target signal), the transmission steering vector and the reception steering vector face an orientation at which the true target is present. Meanwhile, in a mirror ghost signal (such as a signal that is received over a path that is the transmission antenna→target→wall→reception antenna), the transmission steering vector faces an orientation at which the true target is present, and the reception steering vector faces an orientation at which the wall is present.

Therefore, in an orientation spectrum of the mirror ghost signal that is obtained for each of the plurality of virtual reception antennas, a periodic error that corresponds to the interval of the transmission antennas appears. This periodic error occurs as a result of disparity between the orientation of the transmission steering vector and the orientation of the reception steering vector. Here, the above-described orientation spectrum shows a distribution of signal strength in relation to each orientation, with a lateral axis indicating orientation and a vertical axis indicating signal strength.

Figure 12:
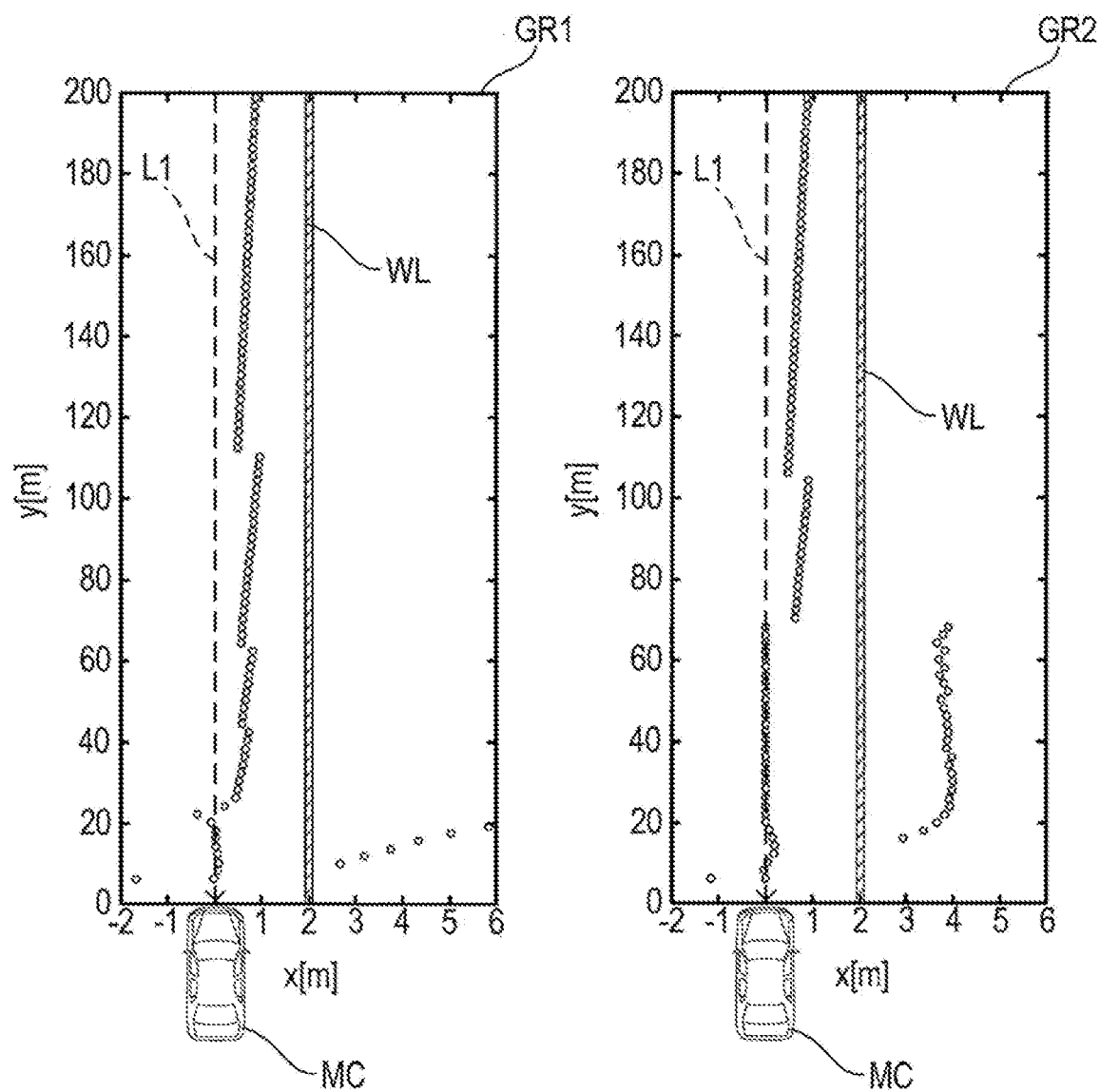
FIG. 12 is a diagram of an estimated trajectory of a target.

FIG. 12 is a diagram of an estimated trajectory of a target in a conventional arrangement of the MIMO antennas and an arrangement of the MIMO antennas according to the present embodiment. Graph G1 shows the estimated trajectory of the target in the conventional arrangement of the MIMO antennas. Graph G2 shows the estimated trajectory of the target in the arrangement of the MIMO antennas according to the present embodiment.

In graphs G1 and G2, in a state in which an own vehicle MC in which the radar apparatus 1 is mounted is arranged in a position (x, y)=(0[m], 0[m]), and a wall WL is arranged in a position (x, y)=(2[m], 0 to 200[m]), the estimated trajectory of the target that approaches the own vehicle MC is indicated by a plurality of circle marks as indicated by a movement trajectory L1.

In graph G1, as the conventional arrangement of the MIMO antennas, M=2, N=6, $d_T$=6d, and $d_R$=d2. In graph G2, as the arrangement of the MIMO antennas according to the present embodiment, M=2, N=6, $d_T$=3d, and $d_R$=d2.

In the conventional arrangement of the MIMO antennas, because the interval between transmission antennas that are adjacent to each other is wide, the periodic error in the mirror ghost signal is low frequency and is concentrated in the periphery of the orientation of the mirror ghost signal. As a result of the periodic error in the mirror ghost signal being concentrated in the periphery of the orientation of the mirror ghost signal, strength of the error increases in the periphery of the orientation of the mirror ghost signal. In addition, a difference in orientation between the target signal and the mirror ghost signal is small. Therefore, discrimination between the target signal and the mirror ghost signal becomes difficult.

Meanwhile, in the arrangement of the MIMO antennas according to the present embodiment, because the interval between transmission antennas that are adjacent to each other is narrow, the period error in the mirror ghost signal is high frequency and is dispersed over a wide orientation range. Therefore, even when the difference in orientation between the target signal and the mirror ghost signal is small, the effect of the error that occurs in the periphery of the orientation of the mirror ghost signal becomes small. Discrimination between the target signal and the mirror ghost signal is facilitated.

As shown in graph G1, in the conventional arrangement of the MIMO antennas, in a position (x, y)=(0[m], 0 to 20[m]), the movement trajectory and the estimated trajectory of the target substantially coincide. Meanwhile, as shown in graph G2, in the arrangement of the MIMO antennas according to the present embodiment, in a position (x, y)=(0[m], 0 to 70[m]), the movement trajectory and the estimated trajectory of the target substantially coincide. In this manner, compared to the conventional arrangement of the MIMO antennas, the radar apparatus 1 according to the present embodiment is capable of more accurately estimating the orientation of the target.

Figure 13:
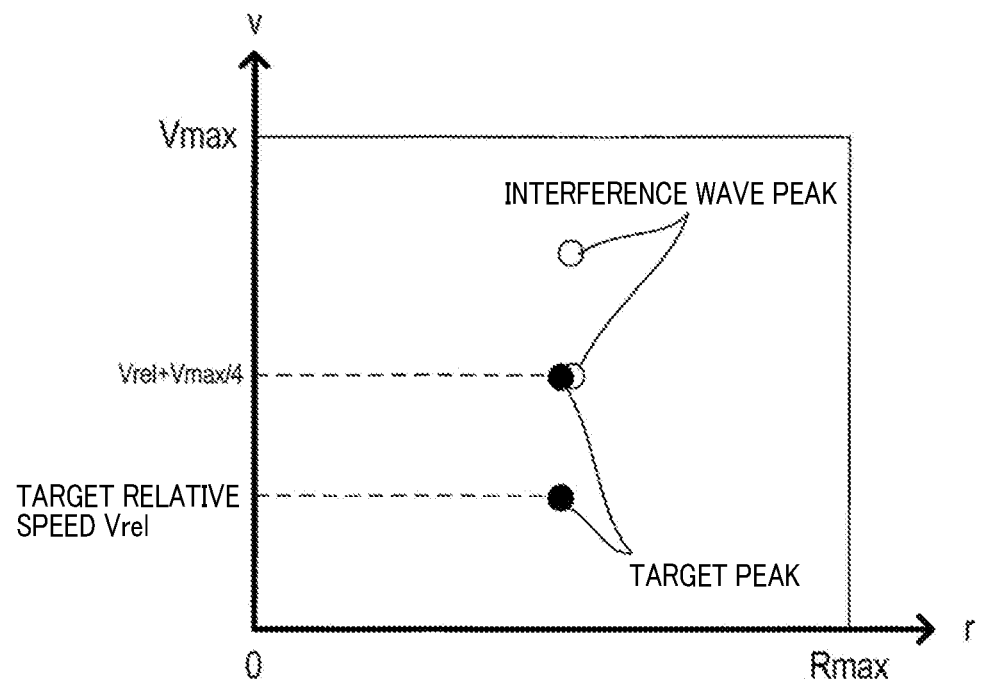
FIG. 13 is a diagram of a reception spectrum.

In addition, the radar apparatus 1 is capable of improving the orientation estimation accuracy regarding a target in a state in which a plurality of targets are present. For example, as shown in FIG. 13, the radar apparatus 1 according to the present embodiment is capable of improving the orientation estimation accuracy regarding a target in a state in which an interference wave is superposed on only the reception signal of either transmission antenna, of the reception signals of the transmission antennas TX1 and TX2.

FIG. 14 shows an orientation spectrum when the target orientation is estimated using the MUSIC method in the conventional arrangement of the MIMO antennas and the arrangement of the MIMO antennas according to the present embodiment. Graph G3 shows the orientation spectrum of the conventional arrangement of the MIMO antennas. Graph G4 shows the orientation spectrum of the arrangement of the MIMO antennas according to the present embodiment.

In the conventional arrangement of the MIMO antennas, because the interval between transmission antennas that are adjacent to each other is wide, a signal component of an interference wave signal is concentrated in the periphery of an interference wave orientation. As shown in graph G3, an interference wave peak is detected at this orientation.

Meanwhile, in the arrangement of the MIMO antennas according to the present embodiment, because the interval between transmission antennas that are adjacent to each other is narrow, the signal component of the interference-wave orientation spectrum is dispersed over a wide orientation. As shown in graph G4, the interference wave peak is difficult to detect.

Furthermore, in the radar apparatus 1, the difference between the first interval $d_T$ and the second interval $d_R$ is equal to the minimum interval d. As a result, the radar apparatus 1 can facilitate work by a designer of the radar apparatus 1 to determine the first interval $d_T$ and the second interval $d_R$ such that the first multiple and the second multiples are coprime.

An embodiment of the present disclosure is described above. However, the present disclosure is not limited to the above-described embodiment and can be carried out through various modifications.

VARIATION EXAMPLE 1

Figure 16:
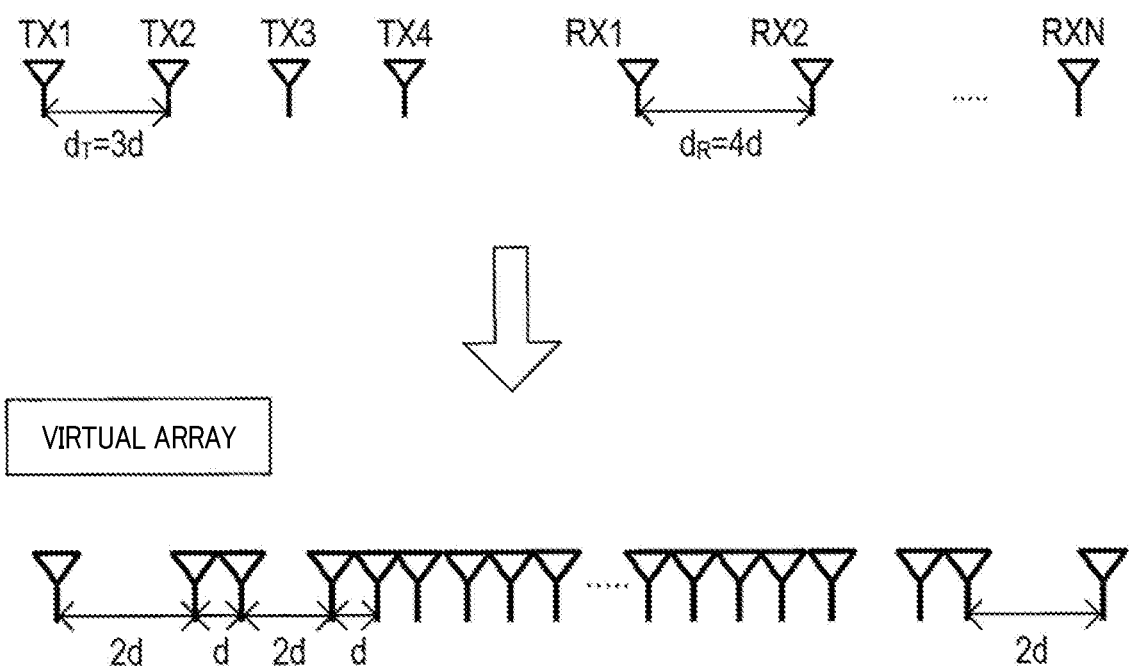
FIG. 16 is a diagram of an arrangement of reception antennas in a virtual array when $d_T=3d$ and $d_R=4d$.
Figure 17:
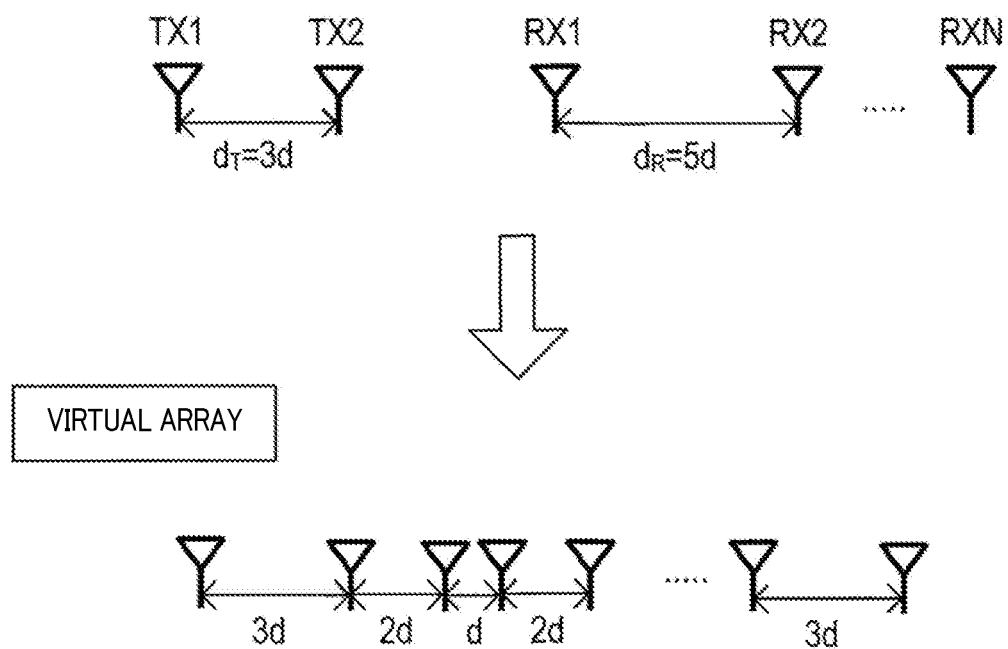
FIG. 17 is a diagram of an arrangement of reception antennas in a virtual array when $d_T=3d$ and $d_R=5d$.

For example, according to the above-described embodiment, an aspect in which $d_T$=3d and $d_R$=2d is given. However, all that is required is that the first interval $d_T$ be equal to a multiplication value of the minimum interval d of the virtual array and the first multiple that is an integer of 2 or greater, the second interval $d_R$ be equal to a multiplication value of the minimum interval d and the second multiple that is an integer of 2 or greater and set to differ from the first multiple, and the first multiple and the second multiple be coprime. For example, as shown in FIG. 15, $d_T$=2d and $d_R$=3d is possible. As shown in FIG. 16, $d_T$=3d and $d_R$=4d is possible. As shown in FIG. 17, $d_T$=3d and $d_R$=5d is possible. As shown in FIG. 15 to FIG. 17, in all of the above-described cases, the minimum interval of the virtual array is d.

VARIATION EXAMPLE 2

Figure 18:
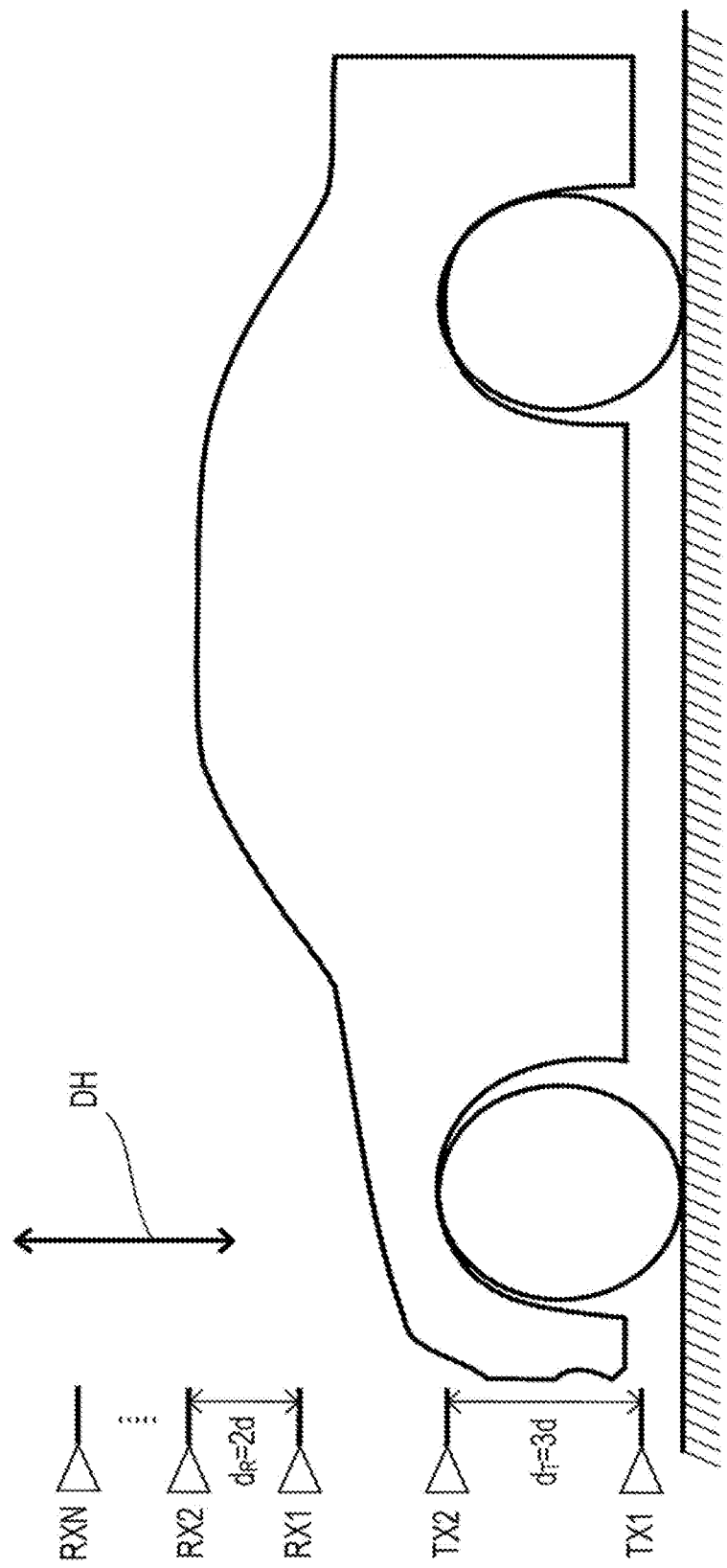
FIG. 18 is a diagram of transmission antennas and reception antennas arranged in a row along a height direction of a vehicle.

According to the above-described embodiment, an aspect in which the transmission antennas and the reception antennas are arranged in a row along the width direction of the vehicle is given. However, as shown in FIG. 18, the transmission antennas and the reception antennas may be arranged in a row along a height direction DH of the vehicle. As a result, the radar apparatus 1 can improve the orientation estimation accuracy regarding a target in a state in which a target signal and a mirror ghost signal attributed to reflection by a road (that is, a signal that is received over a path that is the transmission antenna→target→road→reception antenna) are superposed.

VARIATION EXAMPLE 3

Figure 19:
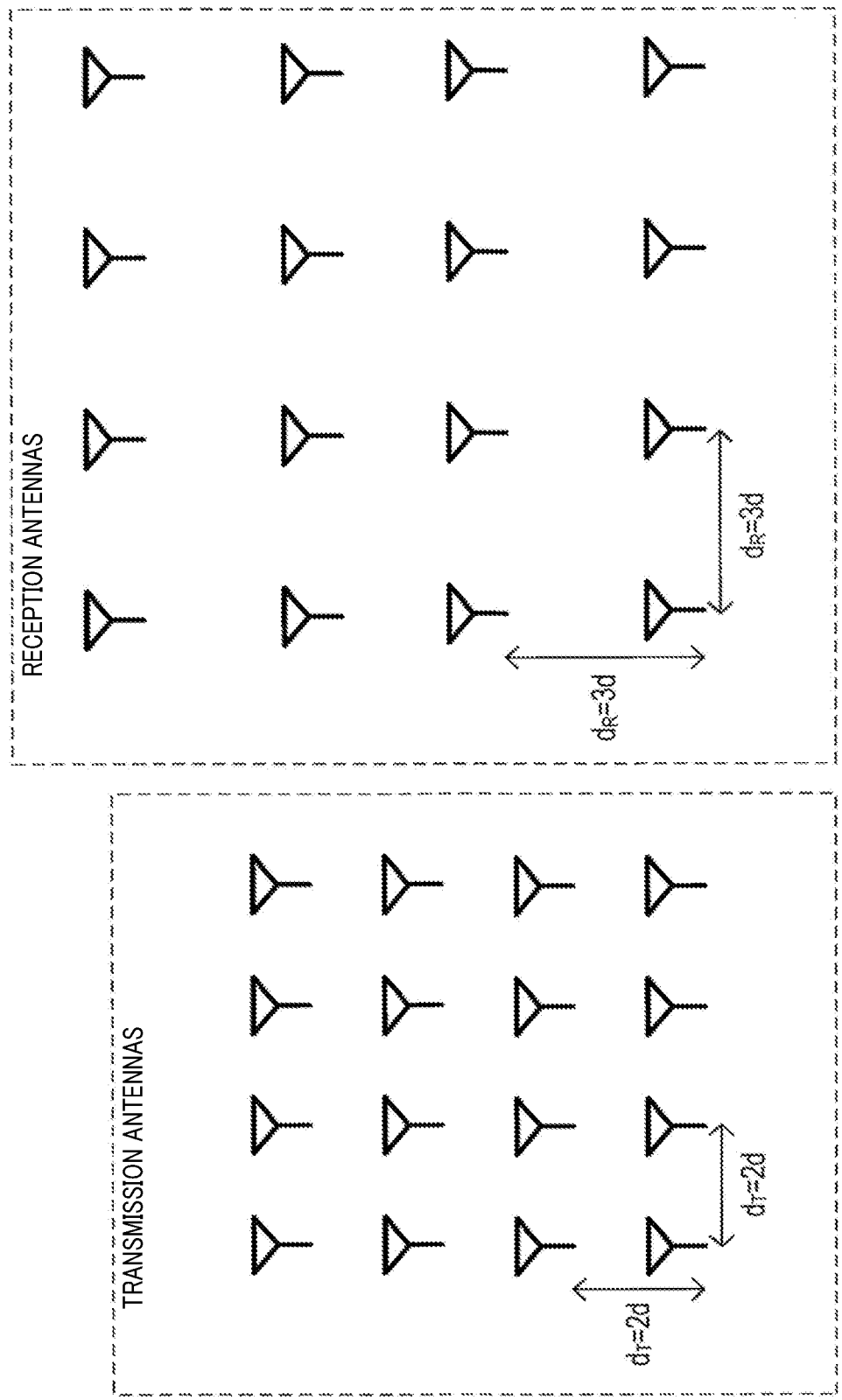
FIG. 19 is a diagram of transmission antennas and reception antennas arranged along an array direction and a perpendicular array direction.

According to the above-described embodiment, an aspect in which the transmission antennas and the reception antennas are arranged in a row along the width direction of the vehicle is given. However, as shown in FIG. 19, the transmission antennas and the reception antennas may be arranged in a matrix. That is, in the transmission antenna unit 3, the plurality of transmission antennas are arranged at the first interval $d_T$ along the array direction, and arranged at the first interval $d_T$ along a perpendicular array direction that is perpendicular to the array direction. In addition, in the reception antenna unit 4, the plurality of reception antennas are arranged at the second interval $d_R$ along the array direction, and arranged at the second interval $d_R$ along the perpendicular array direction. As a result, the radar apparatus 1 can detect the position of an object in three dimensions, rather than two dimensions. For example, when the array direction is the width direction of the vehicle and the perpendicular array direction is the height direction of the vehicle, the position of the object can be detected in three dimensions by the position along the width direction of the vehicle and the position along the height direction of the vehicle.

Moreover, a function provided by a single constituent element according to the above-described embodiments may be divided among a plurality of constituent elements. Functions provided by a plurality of constituent elements may be provided by a single constituent element. In addition, a part of a configuration according to the above-described embodiments may be omitted. Furthermore, at least a part of a configuration according to an above-described embodiment may be added to or replace a configuration according to another of the above-described embodiments.

The present disclosure can also be actualized by various modes in addition to the above-described radar apparatus 1, such as a system of which the radar apparatus 1 is a constituent element.

What is claimed is:

1. A radar apparatus comprising:
a transmission antenna unit that includes a plurality of transmission antennas that are arranged in a row along an array direction that is set in advance, at a first interval that is set in advance;
an oscillator that generates a common signal that is a continuous wave;
a modulator that generates a plurality of transmission signals that are inputted to the plurality of transmission antennas, by performing phase-shift keying in which a phase of a split signal is rotated at each repetition period set in advance, by a phase rotation amount that differs for each of a plurality of split signals generated by splitting the common signal into a same number of signals as the plurality of transmission antennas;
a reception antenna unit that includes a plurality of reception antennas that are arranged in a row along the array direction at a second interval that is set to differ from the first interval; and
a processor that generates information related to an object that reflects a radiation wave from the transmission antenna unit based on a plurality of signal components corresponding to the plurality of transmission signals extracted from each of a plurality of reception signals received by the reception antenna unit, wherein
the plurality of transmission antennas and the plurality of reception antennas form a virtual array in which a plurality of virtual reception antennas are arranged in a row along the array direction,
the first interval is equal to a multiplication value of a minimum interval that is a minimum value of an arrangement interval of the plurality of virtual reception antennas and a first multiple that is an integer of 2 or greater,
the second interval is equal to a multiplication value of the minimum interval and a second multiple that is an integer of 2 or greater and set to differ from the first multiple, and
the first multiple and the second multiple are coprime.

2. The radar apparatus according to claim 1, wherein:
a difference between the first interval and the second interval is equal to the minimum interval.

3. The radar apparatus according to claim 2, wherein:
the radar apparatus is mounted in a vehicle; and
the array direction is a height direction of the vehicle.

4. The radar apparatus according to claim 3, wherein:
the transmission antenna unit is formed into a matrix by the plurality of transmission antennas being arranged at the first interval along the array direction and arranged at the first interval along a perpendicular array direction that is perpendicular to the array direction; and
the reception antenna unit is formed into a matrix by the plurality of reception antennas being arranged at the second interval along the array direction and arranged at the second interval along the perpendicular array direction.

5. The radar apparatus according to claim 2, wherein:
the transmission antenna unit is formed into a matrix by the plurality of transmission antennas being arranged at the first interval along the array direction and arranged at the first interval along a perpendicular array direction that is perpendicular to the array direction; and
the reception antenna unit is formed into a matrix by the plurality of reception antennas being arranged at the second interval along the array direction and arranged at the second interval along the perpendicular array direction.

6. The radar apparatus according to claim 1, wherein:
the radar apparatus is mounted in a vehicle; and
the array direction is a height direction of the vehicle.

7. The radar apparatus according to claim 6, wherein:
the transmission antenna unit is formed into a matrix by the plurality of transmission antennas being arranged at the first interval along the array direction and arranged at the first interval along a perpendicular array direction that is perpendicular to the array direction; and
the reception antenna unit is formed into a matrix by the plurality of reception antennas being arranged at the second interval along the array direction and arranged at the second interval along the perpendicular array direction.

8. The radar apparatus according to claim 1, wherein:
the transmission antenna unit is formed into a matrix by the plurality of transmission antennas being arranged at the first interval along the array direction and arranged at the first interval along a perpendicular array direction that is perpendicular to the array direction; and
the reception antenna unit is formed into a matrix by the plurality of reception antennas being arranged at the second interval along the array direction and arranged at the second interval along the perpendicular array direction.

* * * * *